United States Patent
Schmidt

(10) Patent No.: US 10,703,342 B2
(45) Date of Patent: Jul. 7, 2020

(54) SENSOR CLEANING

(71) Applicant: Ford Global Technologies, LLC, Dearborn, MI (US)

(72) Inventor: David Schmidt, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 222 days.

(21) Appl. No.: 15/704,464

(22) Filed: Sep. 14, 2017

(65) Prior Publication Data

US 2019/0077377 A1    Mar. 14, 2019

(51) Int. Cl.
| | |
|---|---|
| *B60S 1/54* | (2006.01) |
| *B08B 5/02* | (2006.01) |
| *B60S 1/66* | (2006.01) |
| *B60S 1/56* | (2006.01) |
| *B08B 3/02* | (2006.01) |
| *G02B 27/00* | (2006.01) |
| *B60S 1/52* | (2006.01) |
| *B60S 1/08* | (2006.01) |

(52) U.S. Cl.
CPC ............... *B60S 1/54* (2013.01); *B08B 3/02* (2013.01); *B08B 5/02* (2013.01); *B60S 1/0848* (2013.01); *B60S 1/52* (2013.01); *B60S 1/56* (2013.01); *B60S 1/66* (2013.01); *G02B 27/0006* (2013.01)

(58) Field of Classification Search
CPC ........................................................ B60S 1/54
See application file for complete search history.

(56) References Cited

U.S. PATENT DOCUMENTS

| | | | |
|---|---|---|---|
| 6,554,210 B2 | 4/2003 | Holt et al. | |
| 7,040,328 B2 | 5/2006 | Woodward | |
| 8,322,776 B2 | 12/2012 | Fioravanti | |
| 2013/0146577 A1 | 6/2013 | Haig et al. | |
| 2014/0009616 A1 | 1/2014 | Nakamura et al. | |
| 2015/0343999 A1* | 12/2015 | Lopez Galera | B60S 1/56 134/30 |
| 2017/0036650 A1 | 2/2017 | Hester et al. | |

FOREIGN PATENT DOCUMENTS

| | | |
|---|---|---|
| EP | 3168094 A1 | 5/2017 |
| WO | 2015120866 A1 | 8/2015 |
| WO | 201674933 A1 | 5/2016 |

OTHER PUBLICATIONS

Ficosa Corporation article entitled "Sensor and Camera Cleaning" (2 pages).
DlhBOWLES article entitled "Camera Sensor Wash," © 2017 (3 pages).

* cited by examiner

*Primary Examiner* — Jason Y Ko
(74) *Attorney, Agent, or Firm* — Frank A. MacKenzie; Bejin Bieneman PLC

(57) ABSTRACT

A system includes a computer programmed to actuate a first nozzle to emit air continuously at a camera, and actuate a second nozzle to simultaneously emit air intermittently at a precipitation sensor. The system may include a camera, a precipitation sensor coupled to the camera, the first nozzle aimed at the camera, the second nozzle aimed at the precipitation sensor, and the computer in communication with the first and second nozzles.

20 Claims, 6 Drawing Sheets

800

SENSOR CLEANING

BACKGROUND

A vehicle, such as an autonomous or semi-autonomous vehicle, typically includes sensors. Some sensors provide data about operation of the vehicle, for example, wheel speed, wheel orientation, and engine and transmission data (e.g., temperature, fuel consumption, etc.). Some sensors detect the position or orientation of the vehicle. For example, the sensors may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world. For example, the sensors may include radar sensors, scanning laser range finders, light detection and ranging (LIDAR) devices, and image processing sensors such as cameras. The sensors may include communications devices, for example, vehicle-to-infrastructure (V2I) or vehicle-to-vehicle (V2V) devices.

The sensors on the vehicle that detect the external environment are exposed to that external environment. The sensors may be obstructed by dirt, dust, debris, precipitation, insects, etc. Obstructions can degrade the performance of the sensors.

DETAILED DESCRIPTION

Figure 1:
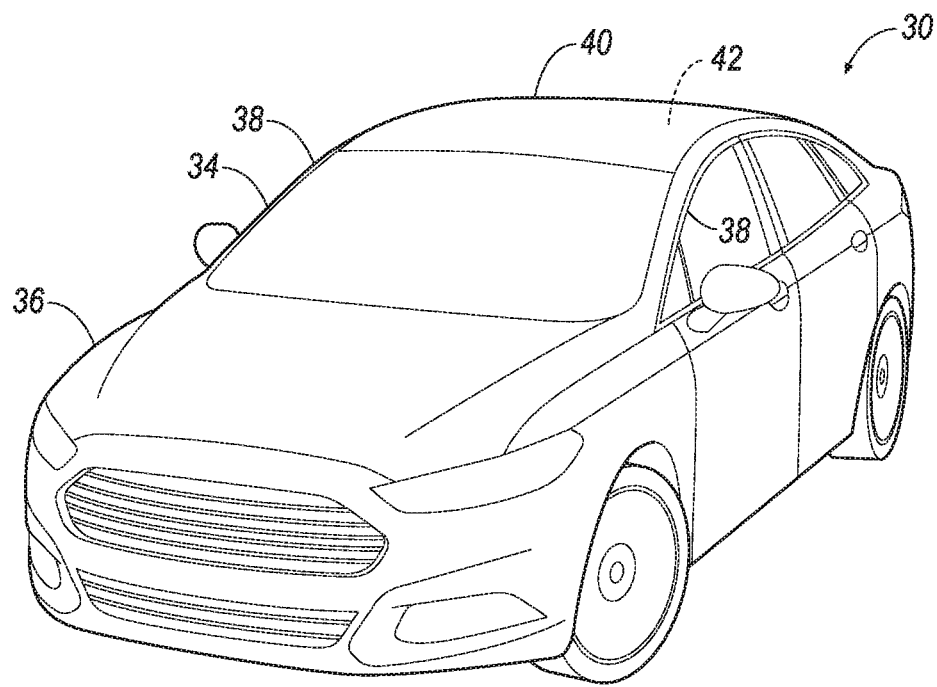
FIG. 1 is a perspective view of an example vehicle.

The cleaning system described herein keeps cameras and a precipitation sensor clear of obstructions while simultaneously allowing the precipitation sensor to detect precipitation. In a fully autonomous vehicle, the cleaning system may allow the vehicle to omit windshield wipers. The omission of windshield wipers can reduce drag and reduce cost and complexity of the vehicle.

A system includes a computer programmed to actuate a first nozzle to emit air continuously at a camera, and actuate a second nozzle to simultaneously emit air intermittently at a precipitation sensor.

The computer may be programmed to, upon determining that one of the camera and the precipitation sensor is obstructed, actuate one of the first nozzle and the second nozzle to emit a burst of air at the one of the camera and the precipitation sensor. The computer may be programmed to determine that one of the camera and the precipitation sensor is obstructed based on data from the camera and from the precipitation sensor.

The burst of air may be a first burst of air, and the computer may be programmed to, upon determining that the one of the camera and the precipitation sensor is obstructed after the one of the first nozzle and the second nozzle emitted the first burst of air, actuate the one of the first nozzle and the second nozzle to emit a second burst of air stronger than the first burst of air.

The computer may be programmed to actuate the first nozzle to emit air continuously at the camera and actuate the second nozzle to simultaneously emit air intermittently at the precipitation sensor upon detecting precipitation.

The computer may be programmed to, upon determining that one of the camera and the precipitation sensor is obstructed and that precipitation is not detected, actuate a third nozzle to spray fluid at the one of the camera and the precipitation sensor, and then actuate one of the first nozzle and the second nozzle to emit a burst of air at the one of the camera and the precipitation sensor.

A method includes actuating a first nozzle to emit air continuously at a camera, and simultaneously actuating a second nozzle to emit air intermittently at a precipitation sensor.

The method may include, upon determining that one of the camera and the precipitation sensor is obstructed, actuating one of the first nozzle and the second nozzle to emit a burst of air at the one of the camera and the precipitation sensor. The method may include determining that one of the camera and the precipitation sensor is obstructed based on data from the camera and from the precipitation sensor.

The burst of air may be a first burst of air, and the method may further include, upon determining that the one of the camera and the precipitation sensor is obstructed after the one of the first nozzle and the second nozzle emitted the first burst of air, actuating the one of the first nozzle and the second nozzle to emit a second burst of air stronger than the first burst of air.

Actuating the first nozzle to emit air continuously at the camera and simultaneously actuating the second nozzle to emit air intermittently at the precipitation sensor may be performed upon detecting precipitation.

The method may include, upon determining that one of the camera and the precipitation sensor is obstructed and that precipitation is not detected, actuating a third nozzle to spray fluid at the one of the camera and the precipitation sensor, and then actuating one of the first nozzle and the second nozzle to emit a burst of air at the one of the camera and the precipitation sensor.

A system includes a camera, a precipitation sensor coupled to the camera, a first nozzle aimed at the camera, a second nozzle aimed at the precipitation sensor, and a computer in communication with the first and second nozzles, the computer programmed to actuate the first nozzle to emit air continuously and to simultaneously actuate the second nozzle to emit air intermittently.

The system may include a windshield, and the camera and the precipitation sensor may be fixed relative to the windshield. The first nozzle may be aimed at a first portion of the windshield in a field of view of the camera, and the second nozzle may be aimed at a second portion of the windshield in a field of view of the precipitation sensor. The computer may be programmed to, upon determining that one of the first portion and the second portion is obstructed, actuate one of the first nozzle and the second nozzle to emit a burst of air at the one of the first portion and the second portion. The camera and the precipitation sensor may be in communication with the computer, and the computer may be programmed to determine that one of the first portion and the second portion is obstructed based on data from the camera and from the precipitation sensor.

The burst of air may be a first burst of air, and the computer may be programmed to, upon determining that the one of the first portion and the second portion is obstructed after the one of the first nozzle and the second nozzle emitted the first burst of air, actuate the one of the first nozzle and the second nozzle to emit a second burst of air stronger than the first burst of air.

The computer may be programmed to actuate the first nozzle to emit air continuously at the camera and simultaneously actuate the second nozzle to emit air intermittently at the precipitation sensor upon detecting precipitation.

The system may include a third nozzle aimed at one of the camera and the precipitation sensor, and the computer may be programmed to, upon determining that the one of the camera and the precipitation sensor is obstructed and that precipitation is not detected, actuate the third nozzle to spray fluid at the one of the camera and the precipitation sensor, and then actuate one of the first nozzle and the second nozzle to emit a burst of air at the one of the camera and the precipitation sensor With reference to FIG. 1, a vehicle 30 may be an autonomous vehicle. A computer 32 can be configured to operate the vehicle 30 independently of the intervention of a human driver, completely or to a lesser degree. The computer 32 may be programmed to operate the propulsion, brake system, steering, and/or other vehicle systems. For the purposes of this disclosure, autonomous operation means the computer 32 controls the propulsion, brake system, and steering; semi-autonomous operation means the computer 32 controls one or two of the propulsion, brake system, and steering and a human driver controls the remainder; and nonautonomous operation means the human driver controls the propulsion, brake system, and steering.

Figure 2:
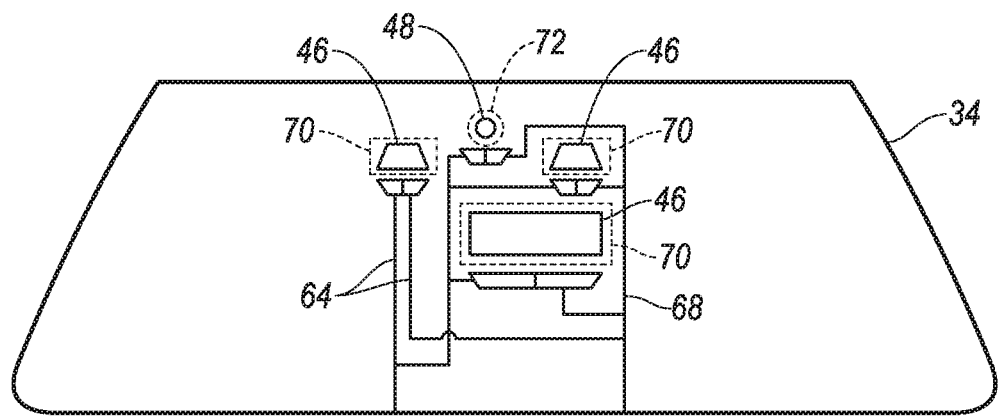
FIG. 2 is a front view of a windshield of the vehicle of FIG. 1.
Figure 3:
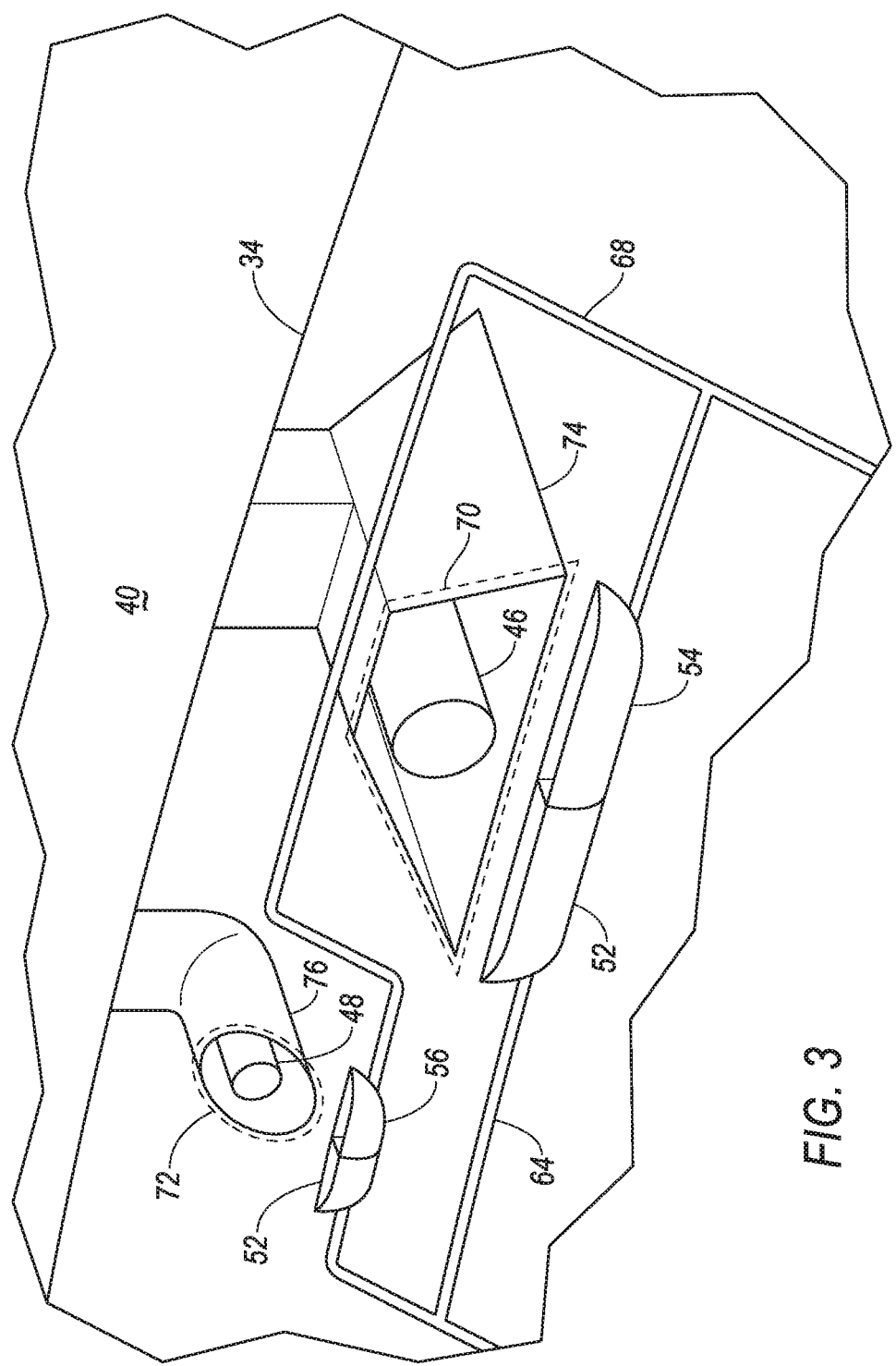
FIG. 3 is a perspective view of a portion of the windshield of FIG. 2.
Figure 4:
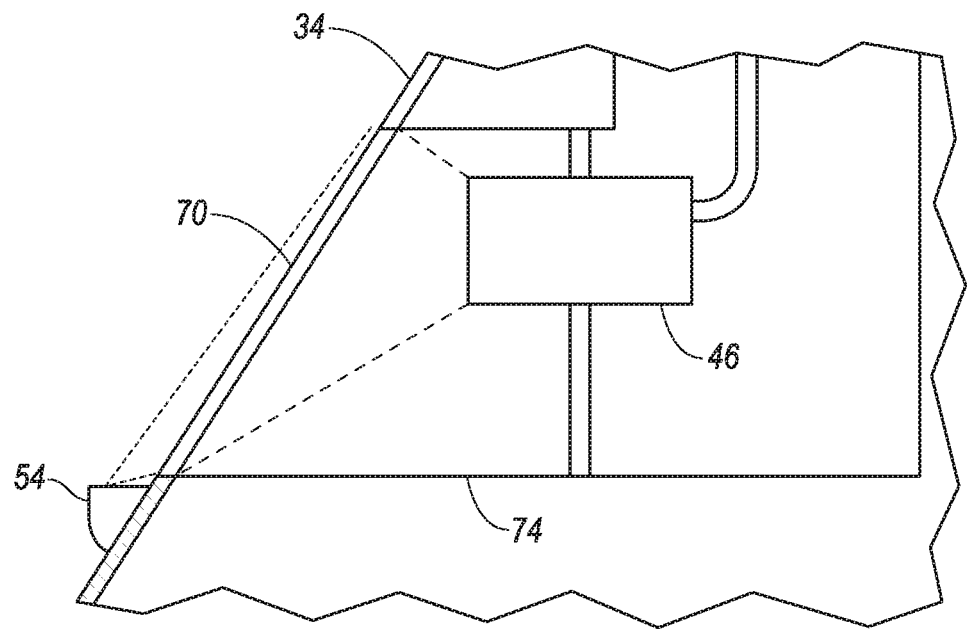
FIG. 4 is a cross-sectional side view of the portion of the windshield of FIG. 3.
Figure 5:
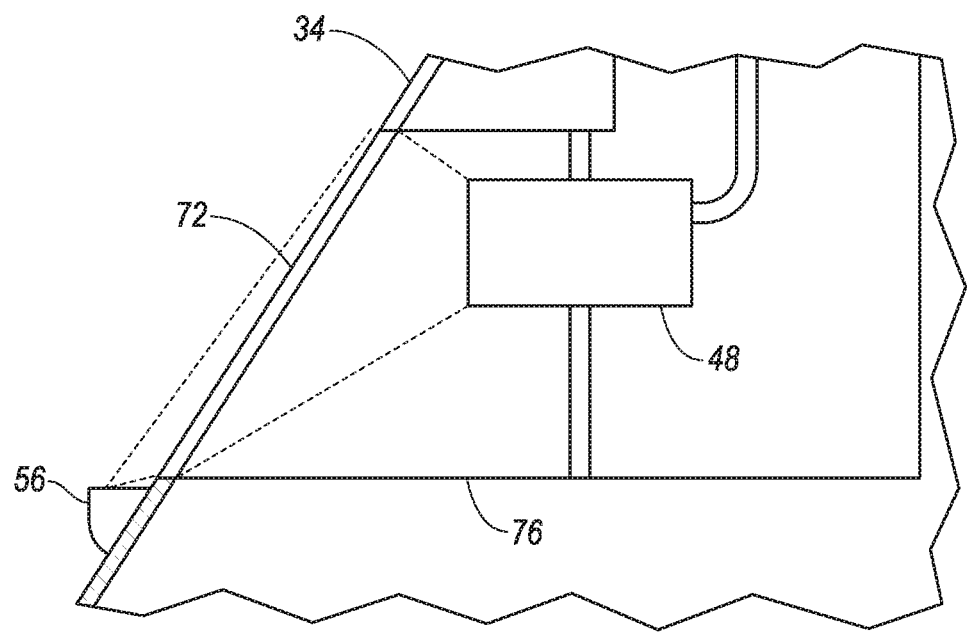
FIG. 5 is another cross-sectional side view of the portion of the windshield of FIG. 3.

With reference to FIGS. 1 and 2, the vehicle 30 includes a windshield 34. The windshield 34 may be disposed above a hood 36, between A pillars 38, below a roof 40, and at a front of a passenger cabin 42. The windshield 34 may be formed of any suitably durable transparent material, including glass such as laminated, tempered glass or plastic such as Plexiglas® or polycarbonate.

Figure 6:
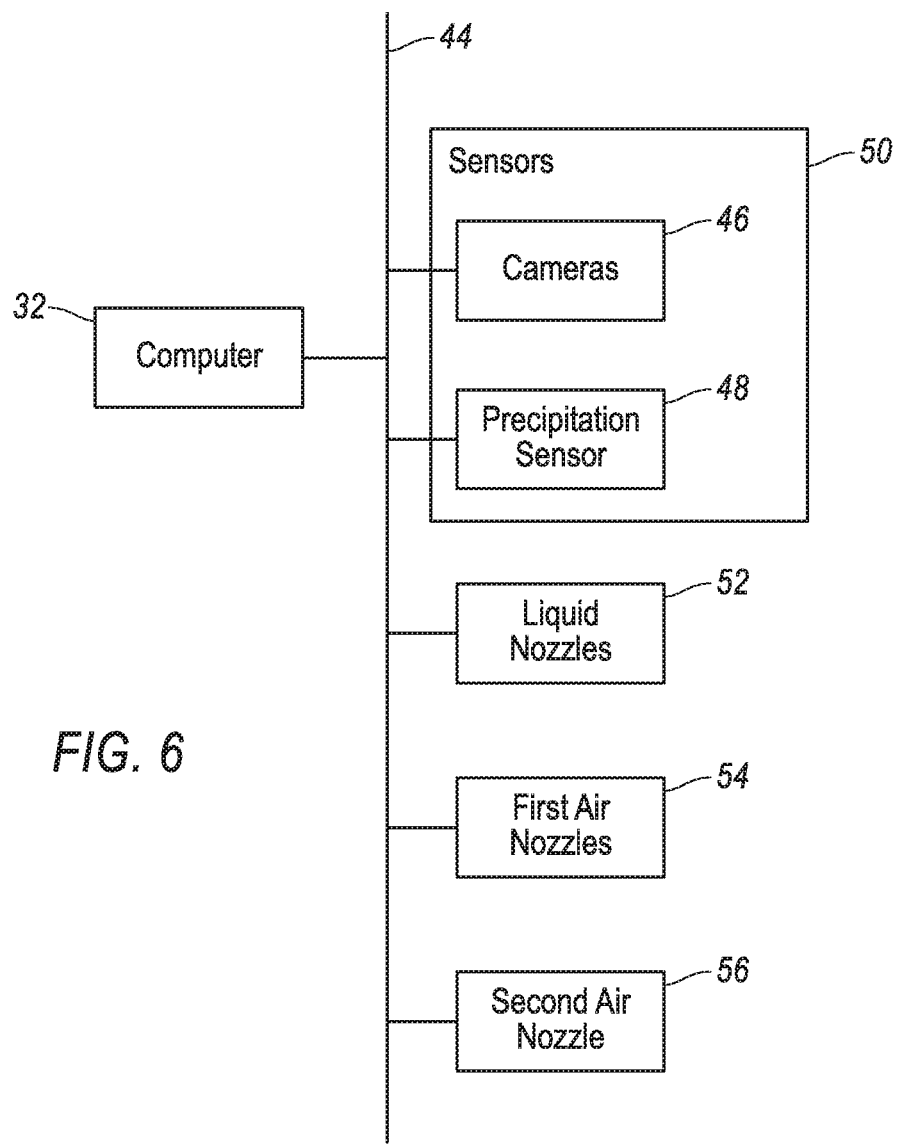
FIG. 6 is a block diagram of a control system of the vehicle of FIG. 1.

With reference to FIG. 6, the computer 32 is a microprocessor-based controller. The computer 32 includes a processor, memory, etc. The memory of the computer 32 includes memory for storing instructions executable by the processor as well as for electronically storing data and/or databases.

The computer 32 may transmit and receive data through a communications network 44 such as a controller area network (CAN) bus, Ethernet, WiFi, Local Interconnect Network (LIN), onboard diagnostics connector (OBD-II), and/or by any other wired or wireless communications network. The computer 32 can communicate with sensors 46, 48, 50 including cameras 46 and a precipitation sensor 48, with liquid nozzles 52, and with air nozzles 54, 56 via the communications network 44.

The sensors 46, 48, 50 may provide data about operation of the vehicle 30, for example, wheel speed, wheel orientation, and engine and transmission data (e.g., temperature, fuel consumption, etc.). The sensors 46, 48, 50 may detect the location and/or orientation of the vehicle 30. For example, the sensors 46, 48, 50 may include global positioning system (GPS) sensors; accelerometers such as piezoelectric or microelectromechanical systems (MEMS); gyroscopes such as rate, ring laser, or fiber-optic gyroscopes; inertial measurements units (IMU); and magnetometers. The sensors 46, 48, 50 may detect the external world, e.g., objects and/or characteristics of surroundings of a vehicle 30, such as other vehicles, road lane markings, traffic lights and/or signs, pedestrians, etc. For example, the sensors 46, 48, 50 may include radar sensors, scanning laser range finders, light detection and ranging (LIDAR) devices, image processing sensors such as the cameras 46, and the precipitation sensor 48. The sensors 46, 48, 50 may include communications devices, for example, vehicle-to-infrastructure (V2I) or vehicle-to-vehicle (V2V) devices.

With reference to FIGS. 2-6, the cameras 46 are mounted in a position permitting a field of view for each camera 46 encompassing a solid angle of the external environment. A "solid angle" is a two-dimensional angle in three-dimensional space, i.e., defining an area in contrast to an angle defining an area in two-dimensions. The cameras 46 may be fixed relative to the windshield 34. For example, the cameras 46 may be disposed, e.g., mounted in a conventional fashion, in the passenger cabin 42 or in a camera housing 74 extending into the passenger cabin 42, and the cameras 46 may be aimed through the windshield 34.

The precipitation sensor 48 is mounted in a position permitting detection of precipitation. The precipitation sensor 48 may be fixed relative to the windshield 34. For example, the precipitation sensor 48 may be disposed, e.g., mounted in a conventional fashion, in the passenger cabin 42 or in a precipitation-sensor housing 76 extending into the passenger cabin 42, and the precipitation sensor 48 may be aimed at the windshield 34.

The precipitation sensor 48 can be any sensor suitable to detect precipitation. For example, the precipitation sensor 48 may include an LED bulb, a light sensor, and possibly a prism reflecting light from the LED bulb to the light sensor; the presence of water scatters some of the light, reducing the light received by the light sensor by a known amount. For another example, the precipitation sensor 48 may include two electrical leads that, when connected, close a circuit; when water is present between the leads, the conductivity of water changes to allow current to flow through the circuit where previous it would not, or changes how much current is flowing by a known amount. For another example, the precipitation sensor 48 may be a piezoelectric sensor coupled to the windshield 34 to detect vibrations from, e.g., precipitation. Vibration data such as amplitude and frequency may be associated with, e.g., types of precipitation such as rain or hail.

With reference to FIGS. 2-5 and 7, a cleaning system 58 of the vehicle 30 includes a reservoir 60, a pump 62, liquid supply lines 64, and the liquid nozzles 52. The reservoir 60, the pump 62, and the liquid nozzles 52 are fluidly connected to each other (i.e., fluid can flow from one to the other). The cleaning system 58 distributes washer fluid stored in the reservoir 60 to the liquid nozzles 52. "Washer fluid" refers to any liquid stored in the reservoir 60 for cleaning. The washer fluid may include solvents, detergents, diluents such as water, etc. The cleaning system 58 also includes a compressor 66, air supply lines 68, and the air nozzles 54, 56. The compressor 66 and the air nozzles 54, 56 are fluidly connected (i.e., connected so that fluid such as air can flow from one to the other) to each other through the air supply lines 68.

Figure 7:
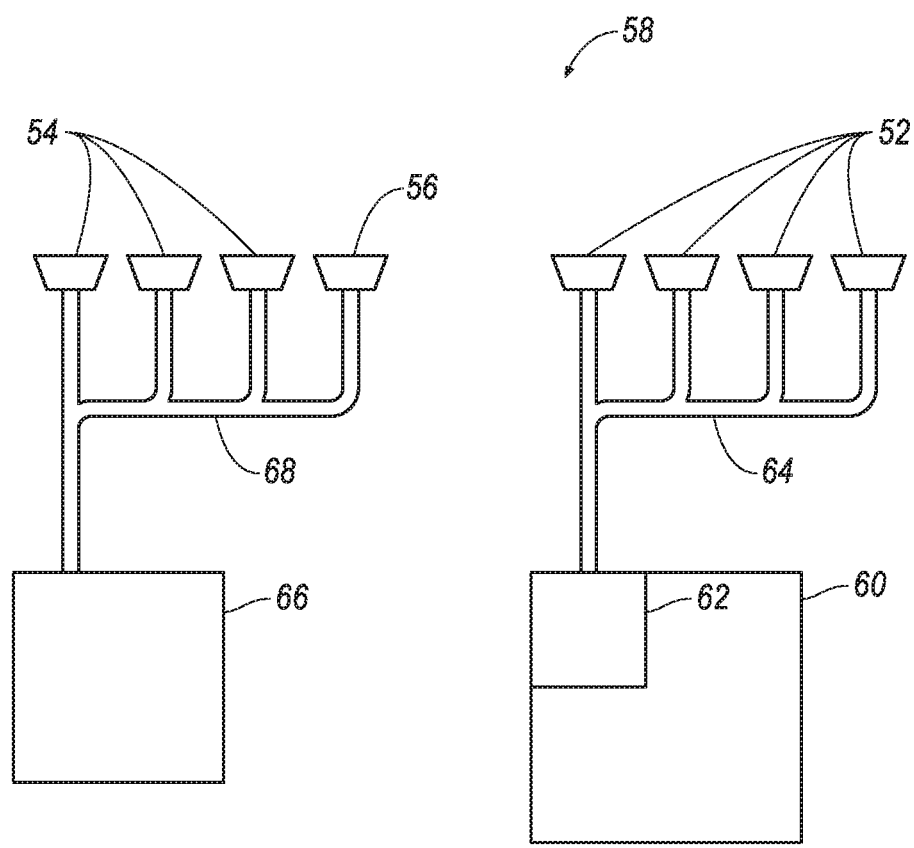
FIG. 7 is diagram of a cleaning system of the vehicle of FIG. 1.

With reference to FIG. 7, the reservoir 60 may be a tank fillable with liquid, e.g., washer fluid for window cleaning. The reservoir 60 may be disposed in a front of the vehicle 30, e.g., in an engine compartment forward of a passenger cabin 42 where it may be mounted and/or secured in a conventional fashion.

The pump 62 may force the liquid washer fluid through the liquid supply lines 64 to the liquid nozzles 52 with sufficient pressure that the washer fluid sprays from the liquid nozzles 52. The pump 62 is fluidly connected to the reservoir 60. The pump 62 may be attached to or disposed in the reservoir 60.

With reference to FIGS. 2-5 and 7, the liquid supply lines 64 extend from the pump 62 to the liquid nozzles 52. The liquid supply lines 64 may be, e.g., flexible tubes.

Each liquid nozzle 52 is fixedly positioned to eject liquid onto a portion 70, 72 of the windshield 34 in the field of view of the precipitation sensor 48 or one of the cameras 46. The liquid nozzles 52 may be aimed at the portions 70, 72 of the windshield 34 in front of the cameras 46 or the precipitation sensor 48. The liquid nozzles 52 may be supported by and mounted to the windshield 34.

With reference to FIG. 7, the compressor 66 increases the pressure of a gas by reducing a volume of the gas or by forcing additional gas into a constant volume. The compressor 66 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

With reference to FIGS. 2-5 and 7, the air supply lines 68 extend from the compressor 66 to the air nozzles 54, 56. The air supply lines 68 may be, e.g., flexible tubes.

The air nozzles 54, 56 include first air nozzles 54 and a second air nozzle 56. (The adjectives "first," "second," "third," etc. are used throughout this document as identifiers and are not intended to signify importance or order.) The first air nozzles 54 are aimed at the cameras 46. For example, each first air nozzle 54 may be aimed at one of the cameras 46. Specifically, the first air nozzles 54 may be aimed at first portions 70 of the windshield 34 in the fields of view of the cameras 46. Each first portion 70 of the windshield 34 is disposed in the field of view of one of the cameras 46. The first air nozzles 54 may be supported by and mounted to the windshield 34.

The second air nozzle 56 is aimed at the precipitation sensor 48. Specifically, the second air nozzle 56 may be aimed at a second portion 72 of the windshield 34 in the field of view of the precipitation sensor 48. The second portion 72 of the windshield 34 is disposed in the field of view of the precipitation sensor 48. The second air nozzle 56 may be supported by and mounted to the windshield 34.

Figure 8:
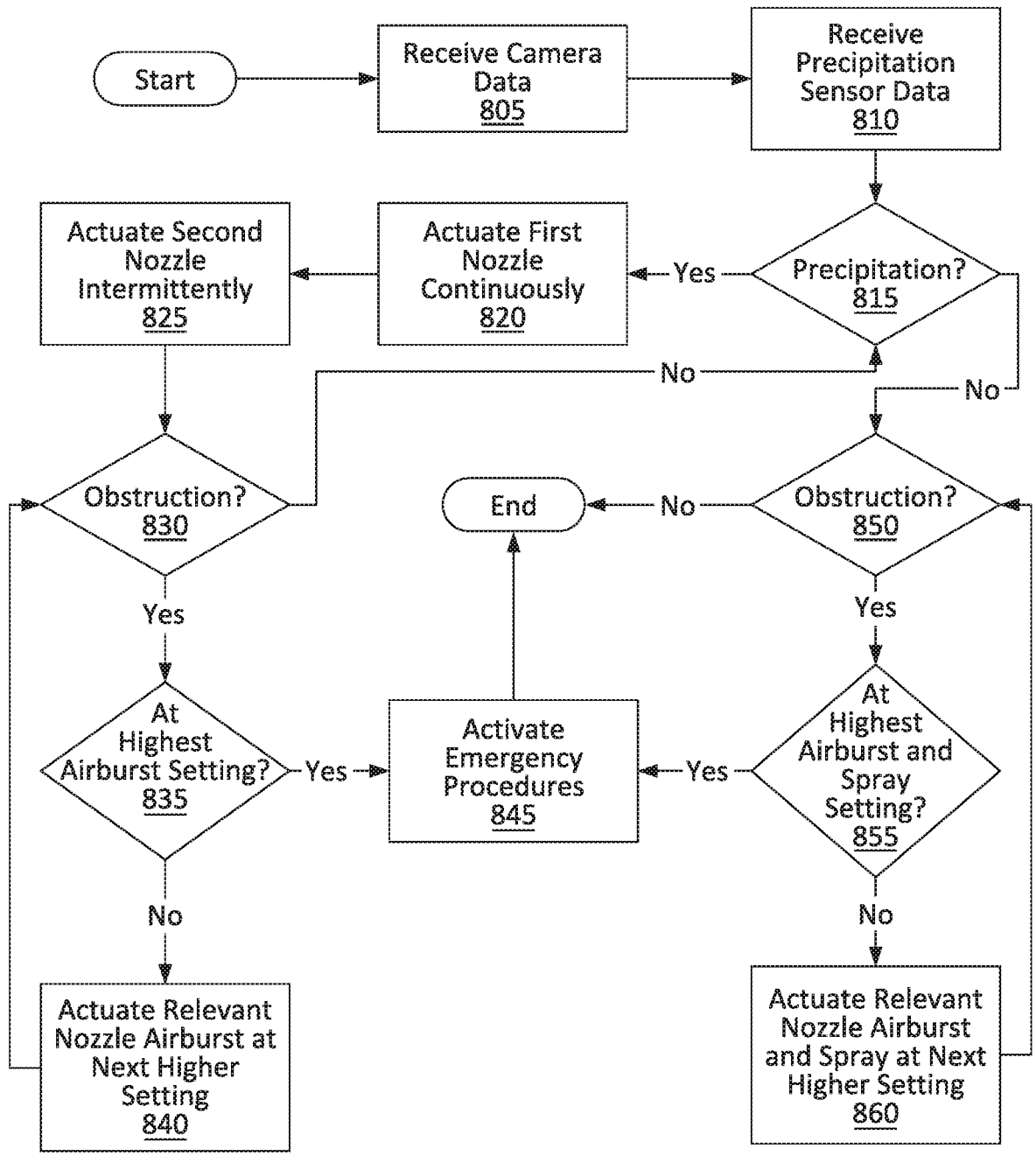
FIG. 8 is a process flow diagram for an example process for cleaning sensors of the vehicle of FIG. 1.

FIG. 8 is a process flow diagram illustrating an exemplary process 800 for cleaning the cameras 46 and the precipitation sensor 48. The memory of the computer 32 stores executable instructions for performing the steps of the process 800.

The process 800 begins in a block 805, in which the computer 32 receives camera data from the cameras 46 via the communications network 44. The camera data may be, e.g., a temporally ordered sequence of image files stores in any suitable format, e.g., MPEG or the like.

Next, in a block 810, the computer 32 receives precipitation data from the precipitation sensor 48 via the communications network 44. The precipitation data may be a quantity of light such as lumens or lux detected by the light sensor of the precipitation sensor 48; a quantity of current; or amplitude, frequency, or other vibration data.

Next, in a decision block 815, the computer 32 determines whether precipitation is detected. The computer 32 may determine whether precipitation is above or below a precipitation threshold based on the precipitation data from the precipitation sensor 48. The precipitation threshold is a quantity stored in the memory of the computer 32 and measured in the same units as the precipitation data, e.g., lumens or lux, amperes, Hertz, etc., depending on the type of precipitation sensor 48. Depending on whether the precipitation data is directly or inversely proportional to the quantity of precipitation, either being above or below indicates precipitation is occurring. The precipitation threshold may be chosen based on experimentation to correspond to whether precipitation is occurring. For example, if the precipitation sensor 48 measures reflected light from the precipitation sensor 48, then lumens or lux data may be recorded under various rainy and dry driving conditions, and the precipitation threshold may be chosen as a cutoff of the lumen or lux measures between identified rainy conditions and identified dry conditions. Alternatively, the precipitation threshold may be chosen to correspond to whether sufficient precipitation is occurring to cause an excessive obstruction level of one of the cameras 46. For example, if the precipitation sensor 48 measures reflected light from the precipitation sensor 48, then lumens or lux data may be recorded under various rainy and dry driving conditions while also receiving data from the cameras 46, and the precipitation threshold may be chosen as a cutoff of the lumen or lux measures when the camera data becomes too unreliable for, e.g., autonomous operation of the vehicle 30 by the computer 32 such as by failing to identify an object in the camera data more than 0.1% of the time. If the precipitation is below the precipitation threshold, the process 800 proceeds to a decision block 850.

If the precipitation is above the precipitation threshold, next, in a block 820, the computer 32 actuates the first air nozzles 54 to emit air continuously at the cameras 46. In other words, the first air nozzles 54 emit air at a substantially constant pressure over time.

Simultaneously with the block 820, in a block 825, the computer 32 actuates the second air nozzle 56 to emit air intermittently at the precipitation sensor 48. For the purposes of this disclosure, "intermittently" means alternating between emitting air at a relatively higher pressure and at a relatively lower pressure or no pressure. The second air nozzle 56 thus simultaneously emits air intermittently at the precipitation sensor 48 as the first air nozzles 54 emit air continuously at the cameras 46. The intermittent emission of air allows some precipitation to accumulate, which allows the precipitation sensor 48 to monitor whether the precipitation is still occurring.

Next, in a decision block 830, the computer 32 determines whether the precipitation sensor 48 or one of the cameras 46 is obstructed, in other words, that one of the first portions 70 and second portion 72 of the windshield 34 are obstructed. The computer 32 makes this determination based on the camera data and the precipitation data. The computer 32 may make the determination based on inconsistencies among the camera data and/or the precipitation data. The computer 32 may use known object-detection and classification techniques to determine which cameras 46 have detected particular objects where the fields of view of the cameras 46 overlap. For example, if the precipitation sensor 48 transmitted precipitation data to the computer 32 indicating that precipitation was occurring but the cameras 46 transmitted camera data indicating detection of the same objects in the overlapping fields of view of the cameras 46, then the computer 32 determines that the precipitation sensor 48 is obstructed. For another example, if one of the cameras 46 transmits camera data from which external objects cannot be detected by the computer 32 but multiple others of the cameras 46 transmit camera data indicating detection of the same objects in the overlapping fields of view of the others of the cameras 46, then the computer 32 determines that the one of the cameras 46 is obstructed. For another example, if one of the cameras 46 is stereoscopic and thus detects distances to objects in the field of view, and if the stereoscopic camera detects at a distance approximately equal to a distance between the stereoscopic camera and the windshield, then the computer 32 determines that the stereoscopic camera is obstructed. If the computer 32 determines that none of the precipitation sensor 48 and the cameras 46 are obstructed, then the process 800 returns to the decision block 815; in other words, so long as precipitation is occurring and the precipitation sensor 48 and the cameras 46 are unobstructed, the first air nozzles 54 emit air continuously and the second air nozzle 56 emits air intermittently.

If the computer 32 determines that one of the precipitation sensor 48 and the cameras 46 is obstructed, next, in a decision block 835, the computer 32 checks whether the air nozzle 54, 56 aimed at the obstructed precipitation sensor 48 or obstructed camera 46 has previously emitted an airburst at a highest airburst setting. An "airburst" is an emission of air for a brief duration, e.g., 1 second, at a higher pressure than what the air nozzle 54, 56 is currently emitting; for example, the first air nozzles 54 can emit airbursts at pressures above the substantially constant pressure for continuous air emission mentioned above, and the second air nozzle 56 can emit airbursts at pressures above the relatively higher pressure for intermittent air emission mentioned above. An "airburst setting" is a pressure at which to emit an airburst that is stored in the memory of the computer 32. The computer 32 may have a schedule (i.e., a look-up table or the like) of airburst settings stored in the memory. The schedule of airburst settings may be arranged in an ascending order of pressures, e.g., |15 mPa|25 mPa|35 mPa|. The "highest airburst setting" is the airburst setting in the schedule having the greatest pressure. The computer 32 checks whether the air nozzle 54, 56 aimed at the obstructed precipitation sensor 48 or obstructed camera 46 has previously emitted an airburst at the highest airburst setting, i.e., the highest pressure stored in the schedule of air pressures, e.g., 35 mPa, since the obstruction was initially detected. If the air nozzle 54, 56 has emitted an airburst at the highest setting, the process 800 proceeds to a block 845.

If the air nozzle 54, 56 has not yet emitted an airburst at the highest setting, next, in a block 840, the computer 32 actuates the air nozzle 54, 56 to emit a burst of air at the obstructed precipitation or the obstructed camera 46. If the airburst is the first airburst emitted by the air nozzle 54, 56, then the air nozzle 54, 56 emits an airburst at a lowest setting, i.e., the lowest pressure stored in the schedule of air pressures, e.g., 15 mPa. If the air nozzle 54, 56 has already emitted an airburst since the obstruction was initially detected, e.g., at 15 mPa, then the air nozzle 54, 56 emits a stronger airburst, typically an airburst at the next highest setting, i.e., the next higher air pressure stored in the schedule of air pressures, e.g., 25 mPa, than the previous airburst. After the block 840, the process 800 returns to the decision block 830 to determine whether the obstruction has been removed.

If the air nozzle 54, 56 has emitted an airburst at the highest setting, after the decision block 835, in the block 845, the computer 32 activates emergency procedures. "Emergency procedures" are responses to emergencies that are programmed into autonomous-driving algorithms used by the computer 32, as are known. For example, the computer 32 may instruct the vehicle 30 to pull over to a side of the road according to the autonomous-driving algorithms, as are known. The computer 32 may transmit a message to a remote server associated with an emergency service. After the block 845, the process 800 ends.

If the precipitation is below the precipitation threshold, after the decision block 815, in a decision block 850, the computer 32 determines whether the precipitation sensor 48 or one of the cameras 46 is obstructed, in other words, that one of the first portions 70 and second portion 72 of the windshield 34 are obstructed. The computer 32 makes this determination based on the camera data and the precipitation data. The computer 32 may make the determination based on inconsistencies among the camera data and the precipitation data as described above. For example, if one of the cameras 46 transmits camera data from which external objects cannot be detected by the computer 32 but multiple others of the cameras 46 transmit camera data indicating detection of the same objects in the overlapping fields of view of the others of the cameras 46, then the computer 32 determines that the one of the cameras 46 is obstructed. If the computer 32 determines that none of the precipitation sensor 48 and the cameras 46 are obstructed, then the process 800 ends.

If the computer 32 determines that one of the precipitation sensor 48 and the cameras 46 is obstructed, next, in a decision block 855, the computer 32 checks whether the air nozzle 54, 56 aimed at the obstructed precipitation sensor 48 or obstructed camera 46 has previously emitted an airburst at the highest airburst setting and the liquid nozzle 52 aimed at the obstructed precipitation sensor 48 or obstructed camera 46 has previously sprayed fluid at a highest spray setting since the obstruction was initially detected. A "spray setting" is a pressure at which to spray that is stored in the memory of the computer 32. The computer 32 may have a schedule (i.e., a look-up table or the like) of spray settings and corresponding airburst settings stored in the memory. Each entry in the schedule may have one associated air pressure and one associated liquid pressure. The schedule may be arranged in an ascending order of airburst settings, spray settings, or both, e.g., |15 mPa/5 mPa|25 mPa/7.5 mPa|35 mPa/10 mPa|, in which the airburst setting is listed first in each entry. The "highest spray setting" is the spray setting in the schedule having the greatest pressure. The computer 32 checks whether the air nozzle 54, 56 aimed at the obstructed precipitation sensor 48 or obstructed camera 46 has previously emitted an airburst at the highest airburst setting, i.e., the highest pressure stored in the schedule of air pressures, e.g., 35 mPa, since the obstruction was initially detected. Alternatively or additionally, the computer 32 checks whether the liquid nozzle 52 aimed at the obstructed precipitation sensor 48 or obstructed camera 46 has previously sprayed fluid at the highest spray setting, e.g., 10 mPa, since the obstruction was detected. If the air nozzle 54, 56 has emitted an airburst at the highest setting or the liquid nozzle 52 has sprayed fluid at the highest setting, the process 800 proceeds to the block 845.

If the air nozzle 54, 56 has not yet emitted an airburst at the highest setting and the liquid nozzle 52 has not yet sprayed fluid at the highest setting, next, in a block 860, the computer 32 actuates the liquid nozzle 52 to spray fluid at the obstructed precipitation sensor 48 or the obstructed camera 46, and then the computer 32 actuates the air nozzle 54, 56 to emit a burst of air at the obstructed precipitation sensor 48 or the obstructed camera 46. If the spray is the first spray by the liquid nozzle 52 and the airburst is the first airburst emitted by the air nozzle 54, 56 since the obstruction was detected, then the liquid nozzle 52 sprays fluid at the lowest spray setting and the air nozzle 54, 56 emits an airburst at the lowest airburst setting, i.e., the lowest liquid pressure and air pressure stored in the schedule of liquid pressures and air pressures, e.g., 5 mPa and 15 mPa, respectively. If the liquid nozzle 52 has already sprayed fluid and the air nozzle 54, 56 has already emitted an airburst, e.g., at 5 mPa and 15 mPa, respectively, then the liquid nozzle 52 sprays a stronger spray of fluid and the air nozzle 54, 56 emits a stronger airburst, specifically, a spray and an airburst at the next highest setting, i.e., the next higher liquid pressure and air pressure stored in the schedule of liquid pressures and air pressures than the previous spray and airburst, e.g., 7.5 mPa and 25 mPa, respectively. After the block 860, the process 800 returns to the decision block 850 to determine whether the obstruction has been removed.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc. In this spirit, "simultaneously" is intended to be understood as "substantially simultaneously."

The article "a" modifying a noun should be understood as meaning one or more unless stated otherwise, or context requires otherwise. The phrase "based on" encompasses being partly or entirely based on.

Computers generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system comprising a computer programmed to:
   receive data from a camera and from a precipitation sensor;
   actuate a first nozzle to emit air continuously at the camera; and
   simultaneously with actuating the first nozzle, actuate a second nozzle to emit air intermittently at the precipitation sensor.

2. The system of claim 1, wherein the computer is programmed to, upon determining that one of the camera and the precipitation sensor is obstructed, actuate one of the first nozzle and the second nozzle to emit a burst of air at the one of the camera and the precipitation sensor.

3. The system of claim 2, wherein the computer is programmed to determine that one of the camera and the precipitation sensor is obstructed based on data from the camera and from the precipitation sensor.

4. The system of claim 2, wherein the burst of air is a first burst of air, and the computer is programmed to, upon determining that the one of the camera and the precipitation sensor is obstructed after the one of the first nozzle and the second nozzle emitted the first burst of air, actuate the one of the first nozzle and the second nozzle to emit a second burst of air stronger than the first burst of air.

5. The system of claim 1, wherein the computer is programmed to actuate the first nozzle to emit air continuously at the camera and actuate the second nozzle to simultaneously emit air intermittently at the precipitation sensor upon detecting precipitation.

6. The system of claim 1, wherein the computer is programmed to, upon determining that one of the camera and the precipitation sensor is obstructed and that precipitation is not detected, actuate a third nozzle to spray fluid at the one of the camera and the precipitation sensor, and then actuate one of the first nozzle and the second nozzle to emit a burst of air at the one of the camera and the precipitation sensor.

7. A method comprising:
  receiving data from a camera and from a precipitation sensor;
  actuating a first nozzle to emit air continuously at the camera; and
  simultaneously with actuating the first nozzle, actuating a second nozzle to emit air intermittently at the precipitation sensor.

8. The method of claim 7, further comprising, upon determining that one of the camera and the precipitation sensor is obstructed, actuating one of the first nozzle and the second nozzle to emit a burst of air at the one of the camera and the precipitation sensor.

9. The method of claim 8, further comprising determining that one of the camera and the precipitation sensor is obstructed based on data from the camera and from the precipitation sensor.

10. The method of claim 8, wherein the burst of air is a first burst of air, the method further comprising, upon determining that the one of the camera and the precipitation sensor is obstructed after the one of the first nozzle and the second nozzle emitted the first burst of air, actuating the one of the first nozzle and the second nozzle to emit a second burst of air stronger than the first burst of air.

11. The method of claim 7, wherein actuating the first nozzle to emit air continuously at the camera and simultaneously actuating the second nozzle to emit air intermittently at the precipitation sensor are performed upon detecting precipitation.

12. The method of claim 7, further comprising, upon determining that one of the camera and the precipitation sensor is obstructed and that precipitation is not detected, actuating a third nozzle to spray fluid at the one of the camera and the precipitation sensor, and then actuating one of the first nozzle and the second nozzle to emit a burst of air at the one of the camera and the precipitation sensor.

13. A system comprising:
  a camera;
  a precipitation sensor coupled to the camera;
  a first nozzle aimed at the camera;
  a second nozzle aimed at the precipitation sensor; and
  a computer in communication with the first and second nozzles, the computer programmed to actuate the first nozzle to emit air continuously and to simultaneously actuate the second nozzle to emit air intermittently.

14. The system of claim 13, further comprising a windshield, wherein the camera and the precipitation sensor are fixed relative to the windshield.

15. The system of claim 14, wherein the first nozzle is aimed at a first portion of the windshield in a field of view of the camera, and the second nozzle is aimed at a second portion of the windshield in a field of view of the precipitation sensor.

16. The system of claim 15, wherein the computer is programmed to, upon determining that one of the first portion and the second portion is obstructed, actuate one of the first nozzle and the second nozzle to emit a burst of air at the one of the first portion and the second portion.

17. The system of claim 16, wherein the camera and the precipitation sensor are in communication with the computer, and the computer is programmed to determine that one of the first portion and the second portion is obstructed based on data from the camera and from the precipitation sensor.

18. The system of claim 16, wherein the burst of air is a first burst of air, and the computer is programmed to, upon determining that the one of the first portion and the second portion is obstructed after the one of the first nozzle and the second nozzle emitted the first burst of air, actuate the one of the first nozzle and the second nozzle to emit a second burst of air stronger than the first burst of air.

19. The system of claim 13, wherein the computer is programmed to actuate the first nozzle to emit air continuously at the camera and simultaneously actuate the second nozzle to emit air intermittently at the precipitation sensor upon detecting precipitation.

20. The system of claim 13, further comprising a third nozzle aimed at one of the camera and the precipitation sensor, wherein the computer is programmed to, upon determining that the one of the camera and the precipitation sensor is obstructed and that precipitation is not detected, actuate the third nozzle to spray fluid at the one of the camera and the precipitation sensor, and then actuate one of the first nozzle and the second nozzle to emit a burst of air at the one of the camera and the precipitation sensor.

* * * * *